Feb. 7, 1928.
H. E. RHOADS
1,658,417
INTERNAL COMBUSTION ENGINE
Filed March 10, 1921
2 Sheets-Sheet 1
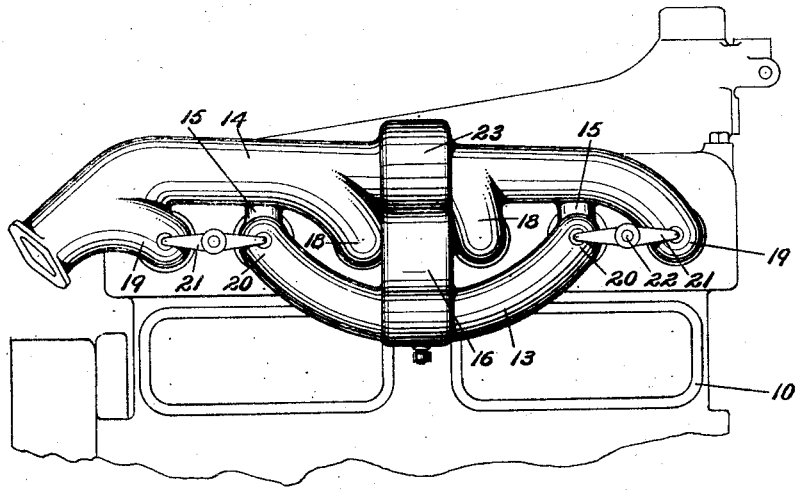
Fig. I
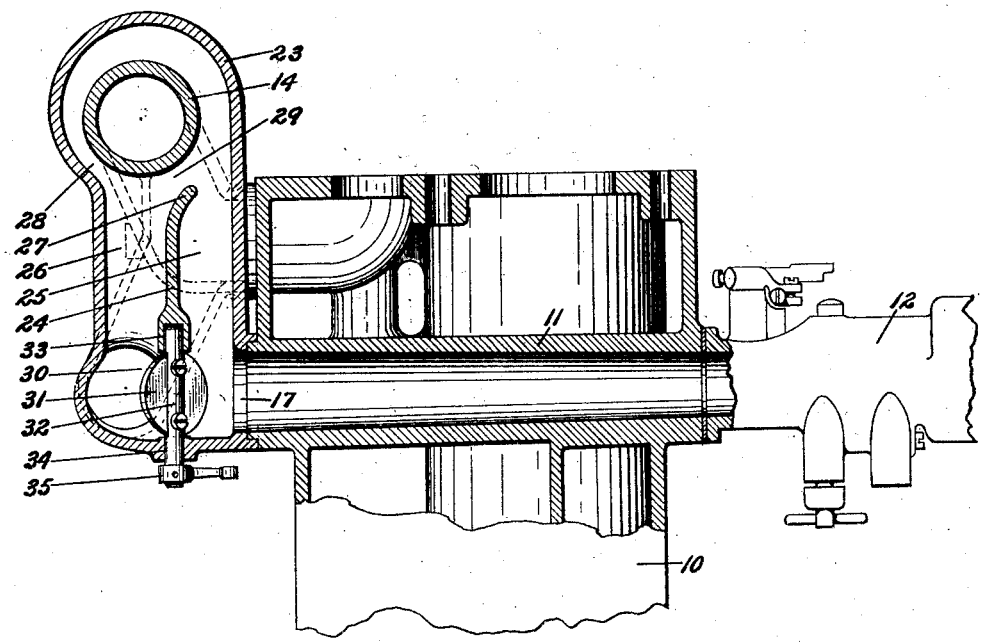
Fig. II
INVENTOR.
Harry E. Rhoads
BY Chester W. Braselton
Harry W. Lindsey Jr.
ATTORNEYS Feb. 7, 1928.
H. E. RHOADS
INTERNAL COMBUSTION ENGINE
Filed March 10, 1921
1,658,417
2 Sheets-Sheet 2
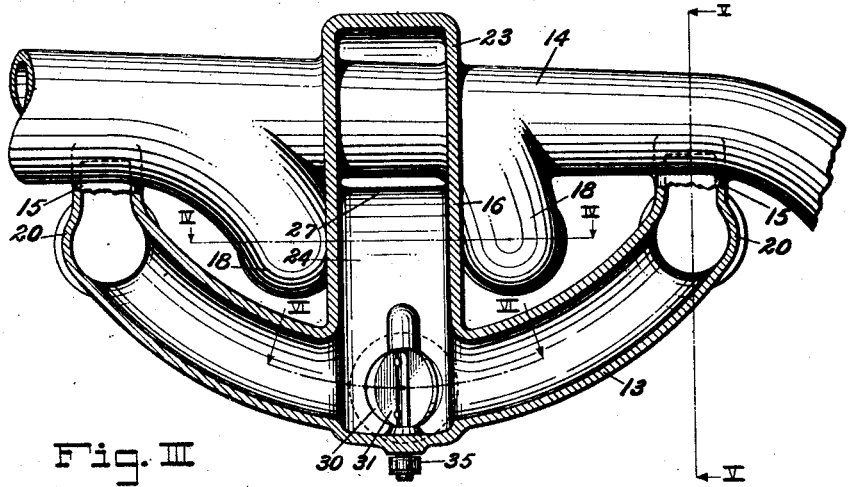
Fig. III
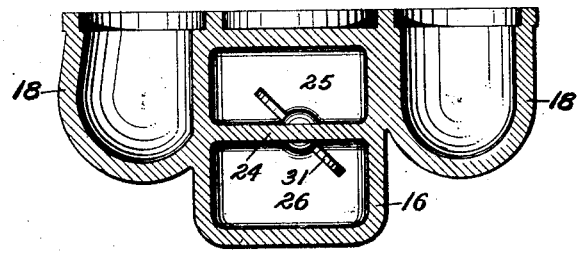
Fig. IV
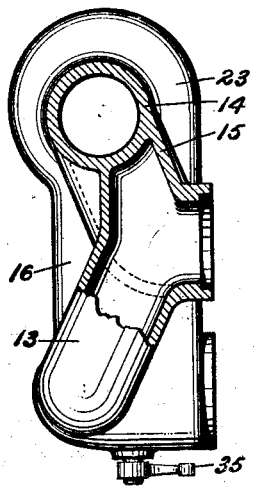
Fig. V
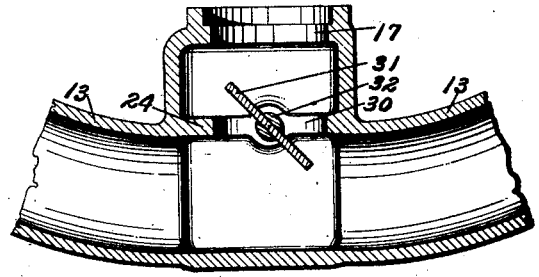
Fig. VI
*INVENTOR.*
Harry E. Rhoads
BY *Chester W. Braselton*
*Harry W. Lindsey Jr.*
*ATTORNEYS.*

Patented Feb. 7, 1928.

1,658,417

UNITED STATES PATENT OFFICE.

HARRY E. RHOADS, OF TOLEDO, OHIO, ASSIGNOR TO THE WILLYS-OVERLAND COMPANY, OF TOLEDO, OHIO, A CORPORATION OF OHIO.

INTERNAL-COMBUSTION ENGINE.

Application filed March 10, 1921. Serial No. 451,299.

My invention relates to internal combustion engines and has for its object to provide a combined intake and exhaust manifold of improved construction for preheating the fuel while passing through the intake portion of the manifold.

A further object of the invention is to provide a combined intake and exhaust manifold adapted to permit varying quantities of the fuel to be passed around the exhaust manifold for the purpose of pre-heating the same.

A further object of the invention is to provide a combined intake and exhaust manifold having a connection between the same affording upwardly and downwardly extending valve controlled passageways whereby all or a portion of the fuel may be conveyed around the exhaust manifold and pre-heated previous to leaving the intake manifold.

With these and other objects in view, the invention comprises certain improved forms of construction, arrangement of parts, and combination of elements which will hereinafter more fully described and claimed, it being understood that the present showing is intended to illustrate one form of the invention, which is susceptible of various modifications to suit special or varying conditions, and it will be further understood that the terms which I have used are merely descriptive and not limiting and that it is my intention to cover any and all modifications which come within the scope of the invention as defined by the appended claims.

In the accompanying drawings I have illustrated one embodiment of the invention in which:

Figure I is a side elevation of an engine embodying the invention.

Figure II is a transverse sectional elevation taken through the center of the manifold shown in Figure I.

Figure III is a vertical section taken on line III—III of Figure II.

Figure IV is a horizontal section taken on line IV—IV of Figure III.

Figure V is a vertical section taken on line V—V of Figure III.

Figure VI is a horizontal section taken on line VI—VI of Figure III.

In hydro-carbon engines, it is well understood that the efficiency of the engine is considerably increased by properly heating the gas or fuel to a certain degree before discharging the same into the combustion chambers of an engine and the present invention is adapted to afford improved means by which this result is accomplished in an economical manner, at all times, regardless of the varying conditions under which the engine is operated.

Referring to the drawings 10 represents an engine of any well known design or type having a tapering fuel inlet tube 11 extending through the engine between certain of the cylinders thereof as shown in Figure II. A carburetor 12 is connected to the outer and smaller end of the tube and on the opposite side of the engine from the carburetor are provided the intake and exhaust manifolds 13 and 14, the extremities of the former being preferably cast integral with the latter as indicated at 15 in Figures I, III and V. A central connection 16 is disposed between the intake and exhaust manifolds at a point directly opposite the transversely extending fuel inlet tube 11 and is provided with an inlet opening 17 communicating with said tube as shown in Figure II. The connection 16 is also preferably cast integral with the intake and exhaust manifolds, but if desired may be cast separately and applied thereto in any desired manner. The exhaust manifold is provided with the two centrally disposed branch portions 18 and also with the end branch portions 19 all of which lead into the main portion of the exhaust manifold from the several exhaust ports of the engine. The outlet ends 20 of the intake manifold are suitably connected with the inlet ports of the engine. Both the intake and exhaust manifolds are clamped upon the engine by means of the bars 21 which are secured by the bolts 22 screwed into the cylinder block or otherwise connected with the same. The connection 16 extending upwardly from the center of the intake manifold is enlarged at 23 at the point where it connects with the exhaust manifold 14 as shown in Figure I. The enlarged portion 23 of the connection surrounds the central portion of the exhaust manifold as indicated in Figure II. The connection 16 is provided with a centrally disposed wall or partition 24 extending upwardly from the bottom of the connection to a point adjacent the exhaust manifold, but preferably in spaced relation with respect thereto, and by means of the partition the connection is divided into upwardly and downwardly extending passageways 25 and 26 respectively, through which the fuel is adapted to pass and by which it is conveyed around or in contact with the exhaust manifold previous to leaving the intake manifold. The upper end of the partition is curved or inclined outwardly with respect to the exhaust manifold to form a deflector as indicated at 27 in Figure II, whereby the heavier particles of gas are thrown outwardly against the wall of the connection previous to passing around the exhaust pipe. The passageway between the portion 23 and the exhaust manifold is of tapering cross section, reaching a minimum at the point 28 where this part of the passageway joins the passage 26. The fuel mixture, is passing this restricted portion, is brought into more intimate relation with the hot exhaust manifold. It will be understood that in the passage of the gas upwardly through the opening 25 that the lighter particles may be drawn through the opening 29 between the top of the partition 24 and exhaust manifold, but that at the same time the heavier particles of gas will be directed upwardly against the wall of the connection and thus will be caused to pass around and over the exhaust manifold. An opening 30 is formed in the bottom of the partition 24 at a point opposite the inlet opening 17 and said opening 30 is adapted to be controlled by a valve 31 carried by a post 32, the upper end of which is journaled in a recess in the wall of the partition 24 as indicated at 33 and the lower end in the wall of the casing as indicated at 34, said post being provided with an arm 35 from which an operating connection may be lead to the dash of the automobile, not shown.

Upon starting the engine, the valve 31 is intended to be kept closed, in order that all of the fuel may pass upwardly in contact with the exhaust manifold and when the engine is warmed up the valve may be opened to any degree desired, depending upon the different climatic and other conditions to be considered, which will of course vary from time to time. The construction shown permits a portion of the fuel to be passed around the exhaust manifold and the remaining portion to pass directly through the intake manifold without coming into contact with the exhaust manifold, and these different proportions may be varied at the will of the operator. Thus the preheating of the fuel may be effected by the heating of one portion and the subsequent mixing of the heated portion with an unheated portion before the fuel reaches the combustion chamber of the engine. It will be understood, however, that when the valve 31 is wide open very little of the fuel will pass upwardly in contact with the exhaust manifold and that consequently there is no danger of having to heat the fuel to an excessive degree if the conditions do not demand it.

While I have shown and described in considerable detail certain specific embodiments of the invention it is to be understood that the present showing is illustrative only and for the purpose of rendering the invention more clear and that I do not regard the invention as limited to the details of construction illustrated or described, except in so far as I have included such limitations within the following claims, in which it is my intention to claim all novelty inherent in the invention, broadly as well as specifically.

What I claim as new and desire to secure by Letters Patent is:

1. The combination with an internal combustion engine, of a combined intake and exhaust manifold, the former having a fuel passageway around a portion of the latter, a partition forming a common wall between portions of said passageway, and a valve in said partition adapted to permit a portion of the fuel to pass directly through the intake manifold without passing around the exhaust manifold.

2. The combination with an internal combustion engine, of a combined intake and exhaust manifold, the former having a fuel passageway extending around a portion of the latter, a partition in said passageway having an inclined portion adapted to direct the fuel outwardly from the exhaust manifold when approaching the same, and a valve controlling an opening in said partition to regulate the quantity of fuel passing around said exhaust manifold.

3. The combination with an internal combustion engine including a carburetor on one side thereof, a combined intake and exhaust manifold on the oposite side of the engine from the carburetor, said intake manifold having a passageway communicating with the carburetor through the engine and extending around a portion of the exhaust manifold, a partition between said intake and exhaust manifold adapted to normally direct the fuel around said exhaust manifold, and a valve for controlling an opening in said partition whereby a portion of the fuel may pass through the intake manifold without passing around said exhaust manifold.

4. The combination with an internal combustion engine, an intake manifold, an exhaust manifold, a connection between the walls of said intake and exhaust manifolds serving as a conduit, said conduit communicating with the intake manifold and having an inlet opening, a partition within said conduit extending above said inlet opening whereby the fuel is caused to pass around the exhaust manifold before leaving the intake manifold, and a valve controlling an opening through said partition whereby the greater amount of the fuel may be permitted to pass through the intake manifold without passing around the exhaust manifold.

5. In a device of the character described, an exhaust manifold, an inlet manifold, means connecting the walls of said manifolds providing connecting passages leading toward said exhaust manifold, around the same and to said inlet manifold, said means also providing a passage directly connecting said passages leading toward said exhaust manifold and to said inlet manifold, said passage around said exhaust manifold being restricted at a point adjacent its opening in the passage leading to the inlet manifold.

6. In a device of the character described, an exhaust manifold, an inlet manifold, an inlet tube, means providing a passageway around said exhaust manifold and connecting with said inlet manifold and said inlet tube, and a partition in said passageway having its end laterally turned and spaced from said exhaust manifold whereby particles of unvaporized fuel are directed against the outer wall of the passageway about the exhaust manifold and whereby the vaporized fuel may take a shorter path around the end of said partition.

7. The combination with an internal combustion engine of a single-piece intake and exhaust manifold, a connection between the walls of the intake and exhaust portions of said manifold, and said connection having a fuel passageway therein, extending from said intake manifold around the exhaust manifold and back to the intake manifold.

8. In a device of the class described, an intake manifold, an exhaust manifold located above the intake manifold, a conduit in communication with the intake manifold forming a connection between the walls of said manifolds, said conduit having a portion extending about said exhaust manifold and having a partition therein extending upwardly and terminating at a point beneath the exhaust manifold, whereby upwardly and downwardly extending passageways are formed for directing the fuel around the exhaust manifold, and a valve controlling an opening adjacent to the bottom of the partition.

In testimony whereof, I affix my signature.

HARRY E. RHOADS.